H. W. COWAN.
LAMP ATTACHMENT FOR AUTOMOBILES.
APPLICATION FILED NOV. 24, 1915.
1,230,382.
Patented June 19, 1917.
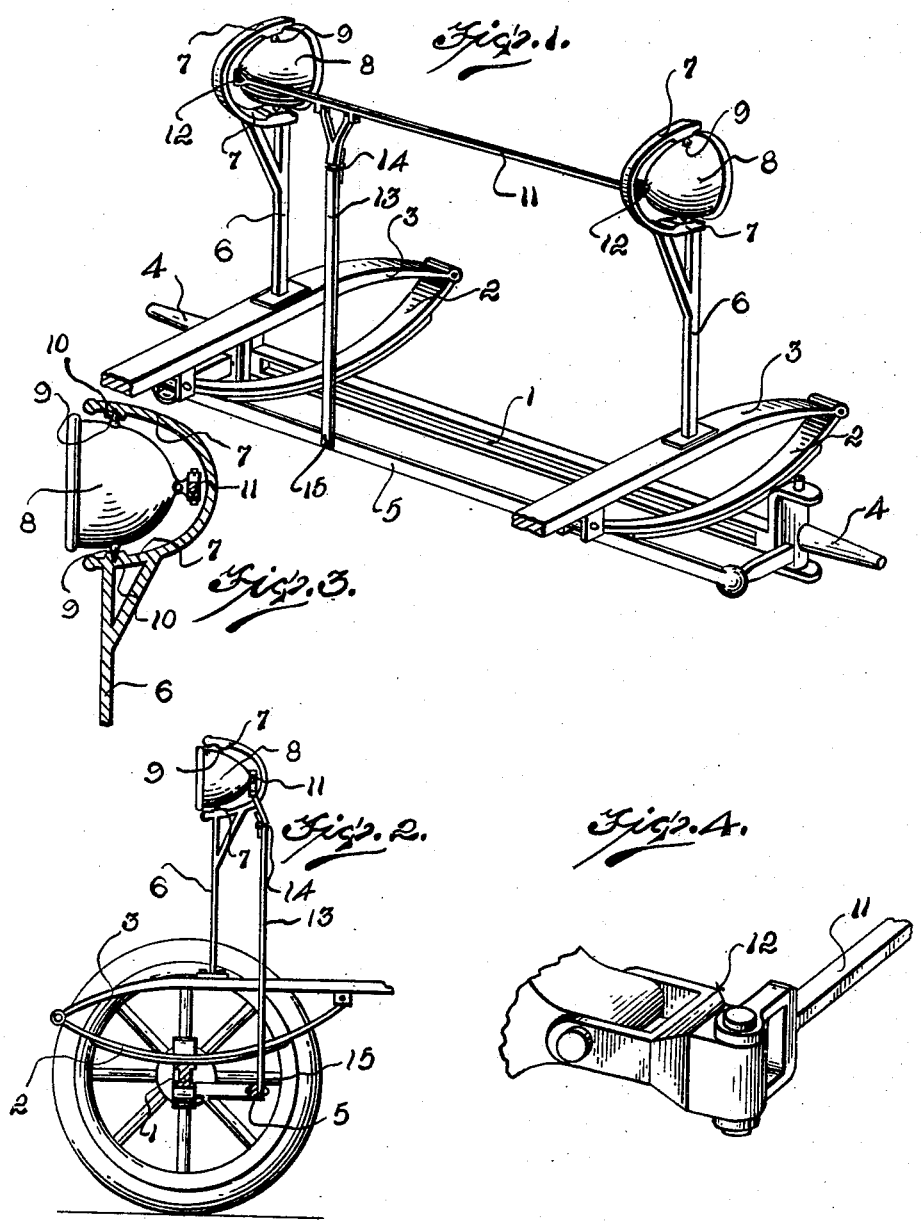

UNITED STATES PATENT OFFICE.

HENRY W. COWAN, OF HUDSON FALLS, NEW YORK.

LAMP ATTACHMENT FOR AUTOMOBILES.

1,230,382.          Specification of Letters Patent.    Patented June 19, 1917.

Application filed November 24, 1915. Serial No. 63,274.

*To all whom it may concern:*

Be it known that I, HENRY W. COWAN, a citizen of the United States, residing at Hudson Falls, in the county of Washington, State of New York, have invented certain new and useful Improvements in Lamp Attachments for Automobiles; and I do hereby declare the following to be a full, clear, and exact description of the invention, such as will enable others skilled in the art to which it appertains to make and use the same.

This invention relates to a lamp attachment for automobiles and particularly to a device for turning the lamps upon vertical pivots.

An object of the invention resides in the provision of a device by means of which the lamps may be turned upon vertical pivots, automatically, in the direction in which the automobile is about to turn.

A further object of the invention resides in so constructing the device that it will be operated by the steering mechanism for the automobile.

A still further object of the invention resides in so constructing the device that it will not be injured by the movement between the frame and body of the automobile although parts of the device are mounted on each.

With these and other objects in view, such as will appear as my description progresses, my invention comprises the combination and arrangement of parts as set forth in and falling within the scope of the appended claim.

In the drawing:

Figure 1 is a perspective view of my device showing the same mounted upon an automobile, only a portion of the latter being shown however;

Fig. 2 is a vertical sectional view;

Fig. 3 is a fragmental detail showing the manner in which the lamps are mounted and Fig. 4 is a fragmental detail showing the connection between the lamps and the rod which extends from one to the other.

Referring to the drawing by reference characters wherein like parts are indicated by like characters throughout the several views:

In the drawing, I have illustrated a portion of an automobile which includes a front axle 1 on which springs 2 are mounted, which springs support the front end of the frame 3. Mounted on the ends of the axle 1 are the usual wheel carrying spindles 4 and extending between and connecting these spindles is a steering rod 5. Secured to and extending upwardly from the side bars of the frame 3 are standards 6 which are provided with spaced arms 7 which form lamp seats. Lamps 8 are mounted between these arms on pins 9, which pins seat in depressions 10 in the said arms. The lamps are mounted so that they may have movement on vertical pivots.

In order that these lamps may be moved, automatically, as the automobile is turned, I have connected the same together by means of a rod 11, which rod is connected to the rear portion of the lamps by universal joints 12. Secured to this rod 11 and extending downwardly therefrom is a rod 13 which is formed in two sections hinged together, at 14. The lower end of the rod is secured, rigidly, to the steering rod 5, at 15.

It is obvious with this construction that when the rod 5 is moved so as to steer the automobile, that the lamps 8 will likewise be moved to throw the light in the direction in which the automobile is turning. Furthermore it will be seen that because of the particular connection between the rod 11 and the lamps and the construction of the rod 13 that the relative movement between the running gear or frame of the automobile and the body will not injure the lamps.

While I have illustrated and described a particular embodiment of my invention, it has merely been for the sake of convenience and I do not wish to be limited to that particular embodiment as it is obvious that numerous changes may be made in the details of construction without departing from the scope of the appended claim.

What I claim is:

A lamp attachment for automobiles, comprising in combination a pair of standards adapted to be mounted on the frame of the automobile, lamps pivotally mounted on said standards on vertical pivots and having rearwardly extended lugs, a rod extending between said lamps, links vertically pivoted to the rod and horizontally pivoted to said lugs, and a hinged sectional rod secured to the first mentioned rod, and secured to the steering mechanism of the automobile, the last mentioned rod being arranged to actuate the first mentioned rod as the automobile is steered.

In testimony whereof, I affix my signature, in the presence of two witnesses.

HENRY W. COWAN.

Witnesses:
MARY HARSHA,
MARY E. LAWLER.

Copies of this patent may be obtained for five cents each, by addressing the "Commissioner of Patents, Washington, D. C."